June 18, 1929. J. W. HARTLEY 1,717,707
APPARATUS FOR SEPARATING MATERIALS OF DIFFERENT DENSITY
SUCH AS COKE FROM CLINKER, BREEZE, AND THE LIKE
Filed April 2, 1928 4 Sheets-Sheet 1
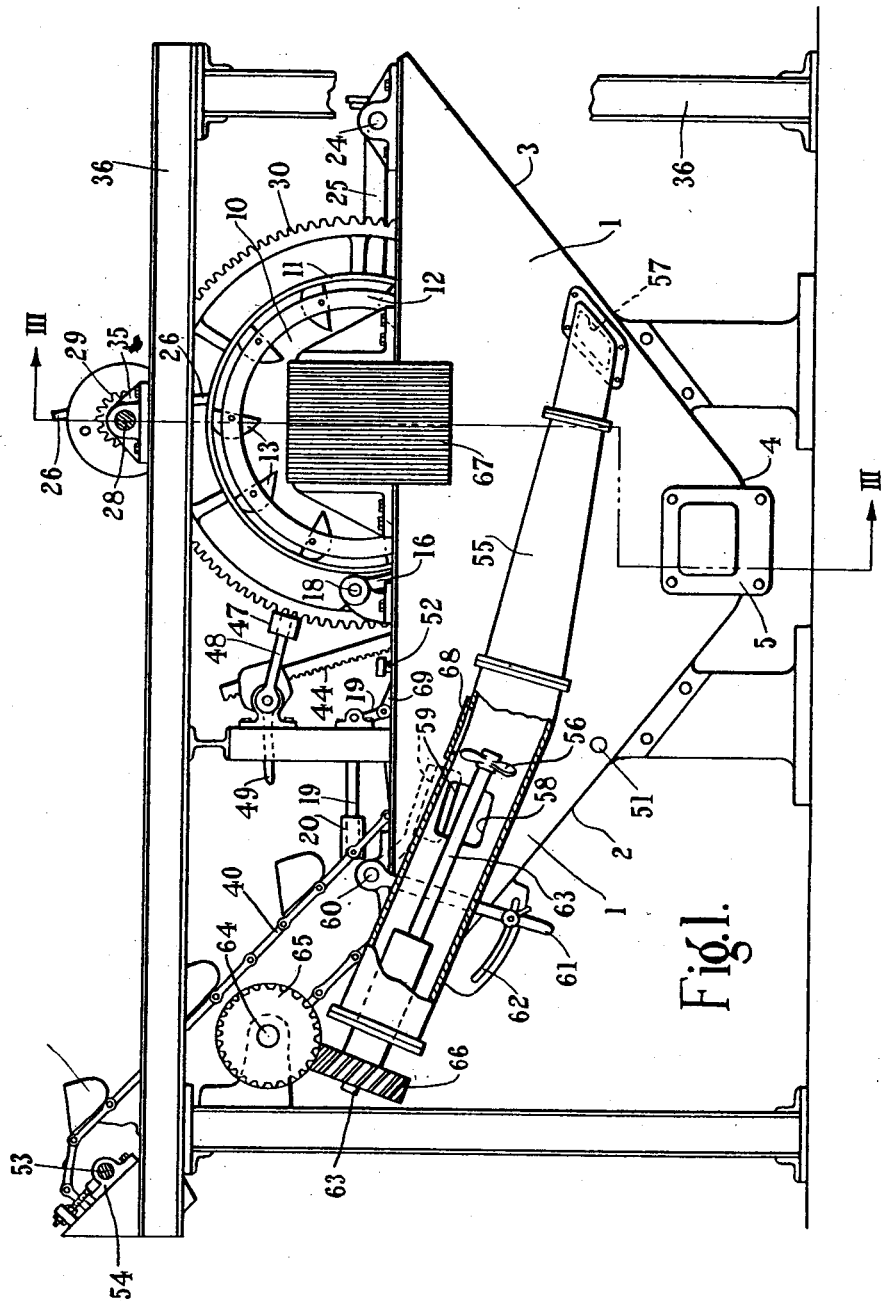

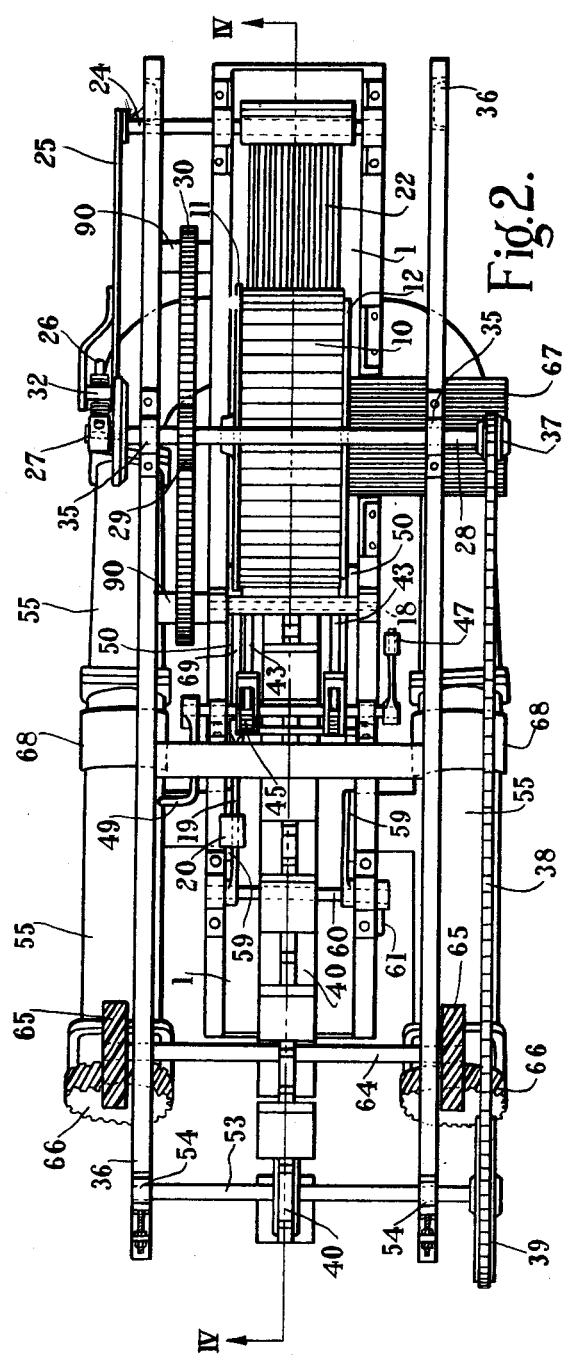

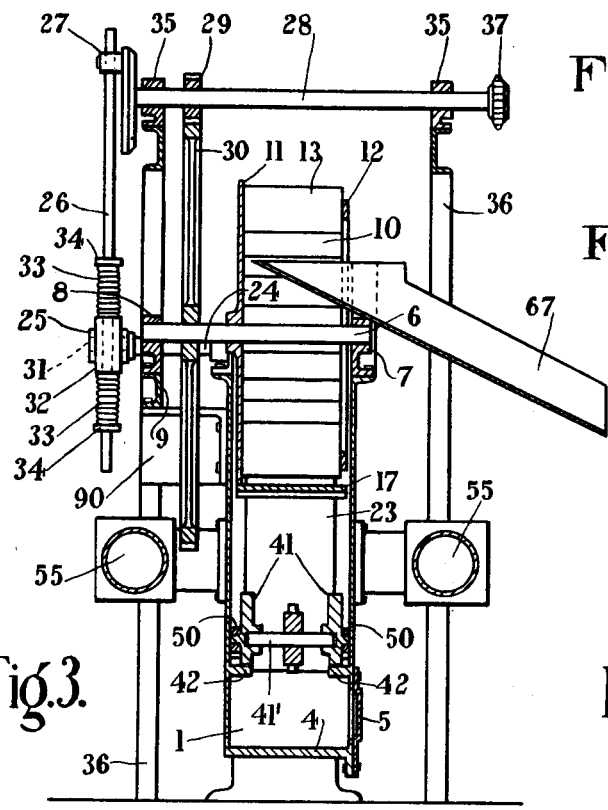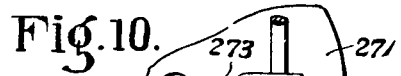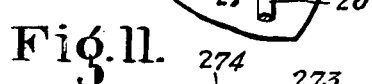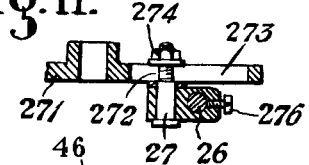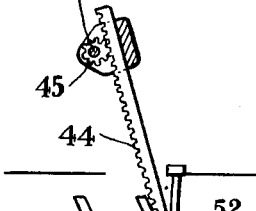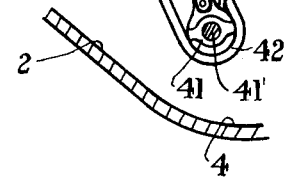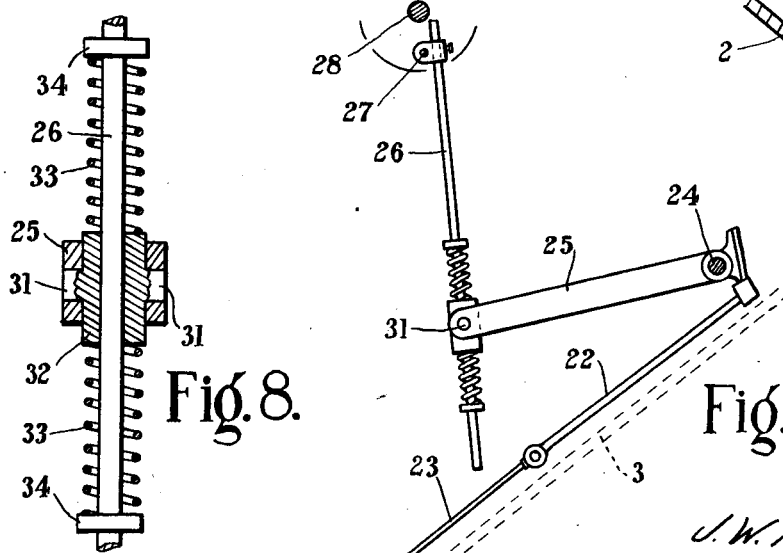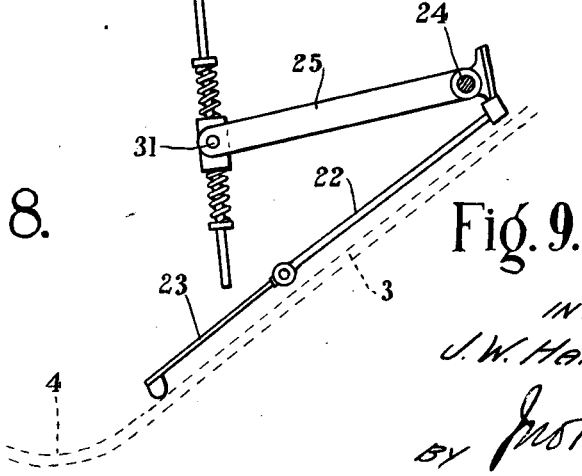

Patented June 18, 1929.

1,717,707

UNITED STATES PATENT OFFICE.

JOHN WILLIAM HARTLEY, OF STONE, ENGLAND.

APPARATUS FOR SEPARATING MATERIALS OF DIFFERENT DENSITY SUCH AS COKE FROM CLINKER, BREEZE, AND THE LIKE.

Application filed April 2, 1928, Serial No. 266,657, and in Great Britain April 4, 1927.

This invention relates to apparatus for separating materials of different density such as coke from clinker, breeze and the like, and of the known type comprising a water tank having a bucket wheel elevator or so-called raff wheel arranged in the upper part thereof and an endless chain elevator extending into the lower part thereof, the two elevators being intended to discharge their contents outside the tank, the former to separate and discharge onto a chute the lighter coke, which floats, and the latter to discharge the heavier clinker, which sinks.

While such known apparatus works fairly well when separating materials which are of relatively much different density such as dry coke and clinker, it is by no means so efficient when materials of more nearly equal densities are to be separated, for instance wet coke and clinker, the wet coke sinking before the bucket wheel can remove it, so that a considerable quantity of coke is apt to escape with the clinker.

Moreover, owing to the gritty water in the tank the accumulation of sludge and the liability of dense pieces of material jamming the conveyors, the known machine is liable to damage and is not easy to maintain in good working order or repair.

The object of the present invention is to avoid these difficulties, that is, to enable the machine to separate efficiently materials differing slightly in specific gravity, for instance, wet coke from clinker, and also to avoid damage to the parts likely to meet with obstructions and to facilitate inspection and repair.

With this object in view the invention comprises the combination of parts as hereinafter described and as claimed in the appended claims.

In the drawings:

Figures 1 and 2 are, respectively, a side elevation of the apparatus partly broken away and a plan of the same.

Figure 3 is a section on the line III—III, Figure 1.

Figures 5 and 6 are, respectively, a plan and a cross section of one of the buckets of the raff wheel.

Figure 7 is a detail view of an alternative method of guiding the lower bearings of the conveyor into their pockets.

Figure 8 is a front sectional view of the mechanism for operating the rocking grating.

Figure 9 is a side view of the same.

Figure 10 is a side view of one form of variable throw crank for operating the rocking grating.

Figure 11 is a plan of the same.

Figure 4:
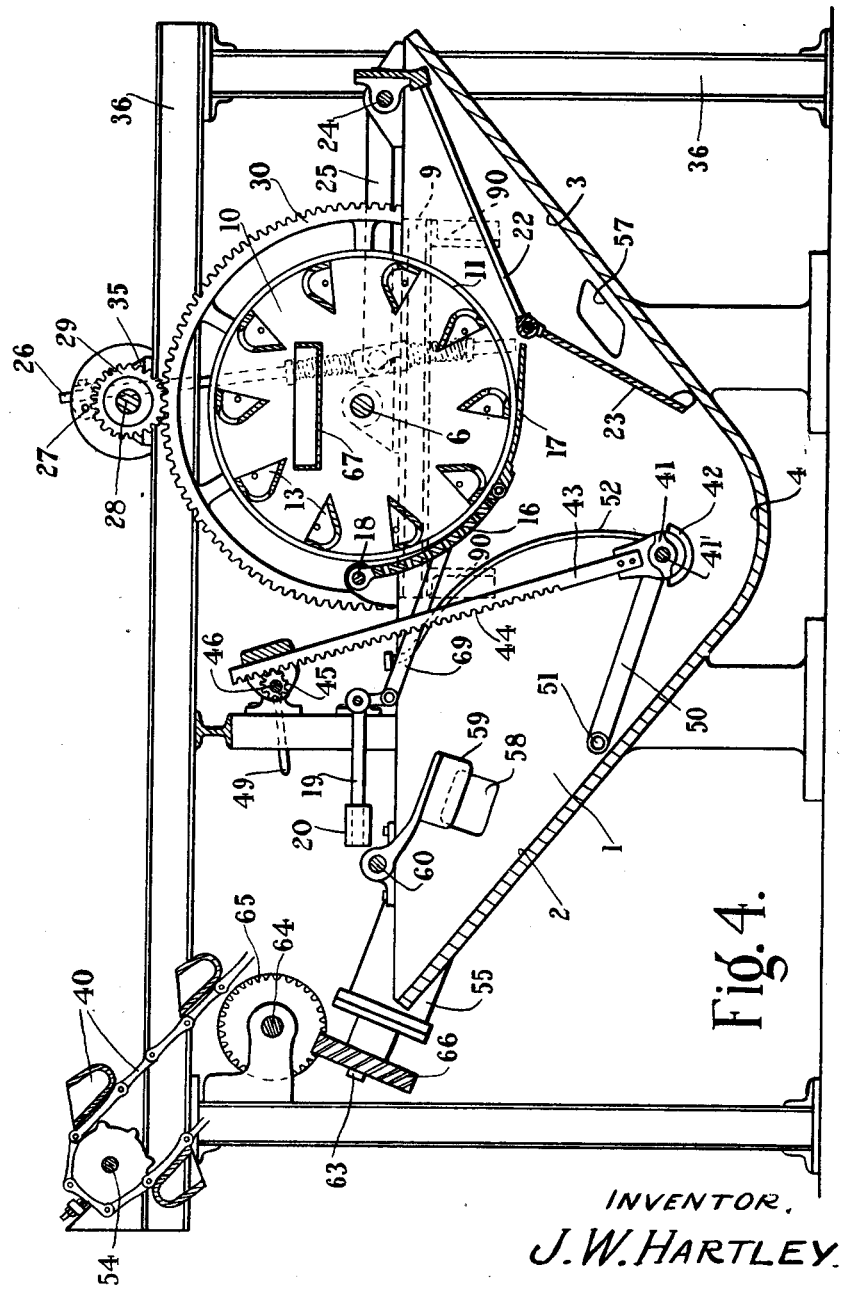
Figure 4 is a section on the line IV—IV, Figure 2.

A tank 1 having steeply inclined ends 2, 3, and vertical sides, being deepest at the centre, has its inclined ends joined together at the deepest part by a curved plate 4. A cleaning door 5 is fitted at one side near the bottom.

A shaft 6 is mounted in bearings 7 and 8, one being mounted on the top edge or flange of the tank at one side and the other on a stretcher bar 9 carried by brackets 90 on the other side of the tank.

A raff wheel 10 on the shaft 6 comprises a disc 11 rotating close to one side of the tank and a ring 12 rotating close to the opposite side, the two supporting the buckets 13 between them. The buckets 13 are of the form shown in Figures 5 and 6 and are bolted to the disc and ring by bolts 14, which may be adapted, if desired, to allow the buckets to pivot slightly in the event of undue stress so as to prevent jamming. The buckets have slots 15.

A perforated partition 16 nearly as wide as the tank, arcuate in vertical section so as to conform to the shape of the raff wheel, extends from the top of the tank down and under the rear portion of the raff wheel 10 and terminates in a portion 17, which is not perforated. The partition 16 is mounted on a shaft 18 and is connected by a link 69 to a bell crank lever 19 provided with a counterweight 20 which normally holds the imperforate plate 17 in close contact with the raff wheel, but in the event of undue pressure on the partition due to an obstruction occurring between it and the raff wheel, it will yield and discharge the material causing the obstruction and so avoid stoppage and damage.

A grating 22 is provided between the raff wheel 10 and the adjacent inclined end 3 of the tank 1. The grating 22 is supported at its upper end, and the lower end beyond the bottom of the raff wheel is joined to a plate 23 resting on the inclined end 3 of the tank.

The grating 22 is preferably oscillated in synchronism with the passing of the buckets 13 of the raff wheel 10 in front of it; for example, its upper end is mounted on a shaft 24 having a lever 25 outside the tank 1 connected by a rod 26 to a crank pin 27 on a disk 271 which is mounted on a shaft 28 which drives the raff wheel 10 by spur wheels 29 and 30 of appropriate ratio according to the number of buckets on the raff wheel, so as to ensure that the grating is rocked as required. The lever 25 has a forked end engaging with trunnions 31 on a block or sleeve 32 freely mounted on the rod 26. Springs 33 on the rod abut at their ends against the sleeve 32 and collars 34 on the rod. This arrangement allows the grating 22 to yield in the event of an obstruction occurring. The crank disc 271 is mounted on the shaft 28 and it may be provided with any usual means for adjusting the crank pin 27 radially to vary the throw. For example, the crank pin 27 may have a screw threaded extension 272 capable of sliding in a slot 273 in the crank disc 271 and locked in any desired position by a nut 274. The rod 26 may be adjustably secured to the crank pin 27. For example, on the crank pin 27 a block 275 is pivotally mounted and is adapted to receive the rod 26. The rod 26 is capable of sliding in the block 275 and locked therein by the set screw 276. By these means the angle of oscillation of the grating and the moments when the screen reaches the highest point of oscillation relatively to the passing of the buckets 13 of the raff wheel 10 may be determined to give the best results.

The shaft 28 which is the main driving shaft is carried above the raff wheel in bearings 35, Figure 2, supported on a frame 36 which may be fixed to the sides of the tank, but is preferably supported independently on the ground as shown, and the same shaft may carry pulleys for driving, screening feeding or elevator gear (not shown), which may be used in connection with the separator for treating coke before delivering it into the tank, as well known in the art. The shaft 28 also has a sprocket pinion 37 which by a chain 38 and a sprocket wheel 39 drives the inclined chain bucket elevator 40, which lifts the clinker and other waste products from the curved bottom of the tank 1. The bearings 41 of the lower shaft 41' of this elevator are carried in open pockets 42 or slot bearings on the sides of the tank 1, so that they can be raised for inspection or repair by suitable means such as rods 43 provided with racks 44 meshing with pinions 45 on a cross shaft 46 at the top of the tank 1, and guided in pivoted guide blocks 68. A counter-weight 47, Figure 1, on a lever 48 on the pinion shaft 46 forces the bearings 41 down into the pockets 42, but allows the rods 43 and lower bearings 41 to yield should the elevator meet with an undue obstruction. The pinion shaft 46 is fitted with a handle 49, so that the bearings can be raised and lowered by one attendant.

Each bearing 41 is attached to a radius rod 50, the other ends of the rods being swivelled from fulcrum pins 51 fixed to the sides of the tank 1. The radius rods 50 guide the chain elevator sprocket shaft bearings 41 into the pockets. As an alternative to the radius rods 50 the bearings 41 may be guided into and out of the pockets 42 by guides provided on the sides of the tank as indicated at 50', Figure 7, these being suitably directed to ensure that the elevator will not foul the partition 16 when it is raised. Flexible tubes 52 connected to the bearings 41 provide for lubrication during work and permit the raising and replacement above described. The bearings 41 may be of suitably closed type to prevent ingress of dirty water. Their outer ends bear against the sides of the tank which act as guides when they are raised and lowered.

The upper sprocket shaft 53 is mounted in adjustable bearings 54 on the frame 36.

When dealing with unscreened coke, each bucket of the elevator preferably has small holes at the bottom and larger holes at the sides and top.

In order to set up a current of water in the tank 1 adjacent to the raff wheel 10 where it separates the coke from the clinker, two pipes 55 are connected to the other end of the tank below the tank water level at the sides near the upper part. Each pipe 55 is fitted with a screw propeller 56, so that water is forced along the pipes, which are downwardly inclined and return it to the tank through two openings 57, one on each opposite side of the tank 1, so that the two opposing currents emerge under the rocking grating 22. The water is thus made to rise through the grating 22 and it passes back through the perforated curved plate 16 to the rear of the tank for further circulation.

The upward current of water floats the wet coke, which would otherwise sink, so that it can be caught by the buckets of the raff wheel 10. The speed of the propellers may be adjusted so that the current can be regulated to suit the density of the material to be separated, but it is preferred to provide means for adjusting the size of the inlet openings 58 to the pumps for this purpose. For instance, the openings 58 are provided with valves such as plates 59 carried on a shaft 60 which is provided with a hand lever 61 adapted to be set by a bolt in any determined position in a slotted quadrant 62. The propeller shafts 63 may project upwards from the rear ends of the pipes 55 through glands or long sleeve bearings above the level of the gritty water in the tank for the protection of the bearings, the shafts being geared together by a cross shaft 64 and skew or other gearing 65, 66. The shaft 64 may be driven in any suitable manner and may be provided with any means for varying the speed. Each pipe has an inspection door 68 to facilitate cleaning or repair of the propellers.

Each pipe 55 as shown, preferably comprises a cylindrical portion having a lateral inlet connection to the adjacent side of the tank, a tapering portion having a flanged connection at its larger end to the outlet end of the cylindrical portion and a flanged connection at the smaller end to a bend having a flanged connection to the adjacent side of the tank, the band having a rhomboidal opening 57 into the tank with one edge flush with the inclined end of the tank, as shown in Figures 1 and 4.

The raff wheel 10 is provided with a laterally inclined discharge chute 67.

I claim:

1. An apparatus for separating coke from clinker and for similar purposes comprising a tank, having inclined ends, a raff-wheel partly immersed in said tank, a grating in said tank adjacent to said raff-wheel onto which the materials to be separated are deposited, said grating having a plate pivoted to the grating at its upper edge and having its lower edge resting on the adjacent inclined end of the tank, means for oscillating said grating and means for creating an upward current of water through said grating towards said raff-wheel substantially as and for the purpose hereinbefore set forth.

2. An apparatus for separating coke from clinker and for similar purposes comprising a tank, a raff-wheel partly immersed in said tank, a grating in said tank adjacent to said raff-wheel onto which the materials to be separated are deposited, means for oscillating said grating, means for creating an upward current of water through said grating towards said raff-wheel and a perforated partition conforming to said raff-wheel, situated on the opposite side thereof to said grating and yielding means for holding said partition adjacent to said raff-wheel substantially as and for the purpose hereinbefore set forth.

3. An apparatus for separating coke from clinker and for similar purposes comprising a tank, a raff-wheel partly immersed in said tank, a grating in said tank adjacent to said raff-wheel onto which the materials to be separated are deposited, means for oscillating said grating, a perforated partition conforming to said raff-wheel and arranged on the opposite side thereof relative to said grating, a pipe on each side of said tank, each pipe having an inlet connection to said tank at a position remote from said raff-wheel and an outlet connection to said tank below said grating, and a propellor within each of said pipes for creating an upward current of water through said grating towards said raff-wheel substantially as and for the purpose hereinbefore set forth.

4. An apparatus for separating coke from clinker and for similar purposes comprising a tank, a raff-wheel partly immersed in said tank, a grating in said tank adjacent to said raff-wheel onto which the materials to be separated are deposited, means for oscillating said grating, a perforated partition conforming to said raff-wheel and arranged on the opposite side thereof relative to said grating, a pipe on each side of said tank, each pipe having an inlet connection to said tank at a position remote from said raff-wheel, a valve for regulating the size of opening of said inlet connection, and an outlet connection to said tank below said grating, and a propellor within each of said pipes for creating an upward current of water through said grating towards said raff-wheel substantially as and for the purpose hereinbefore set forth.

5. An apparatus for separating coke from clinker and for like purposes comprising a tank having inclined ends, a raff-wheel partly immersed in said tank, a perforated partition conforming to the shape of said raff-wheel and situated on one side thereof, an oscillatory grating on the opposite side of said raff-wheel, onto which the material is to be deposited, means for oscillating said grating adjacent to said raff-wheel and in synchronism with the passing of the buckets thereof, means for creating an upward current of water through said grating towards said raff-wheel, and means for removing clinker or other solid deposited on the bottom of the tank, substantially as and for the purpose hereinbefore set forth.

In testimony whereof I have signed my name to this specification.

JOHN WILLIAM HARTLEY.